E. W. MILLER.
VALVE MECHANISM.
APPLICATION FILED DEC. 2, 1916.
1,376,109.
Patented Apr. 26, 1921.
3 SHEETS—SHEET 1.
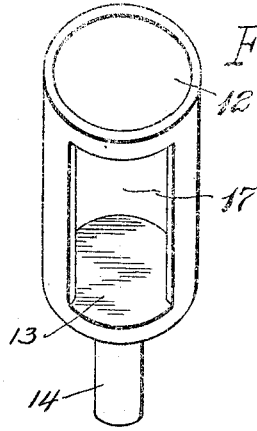
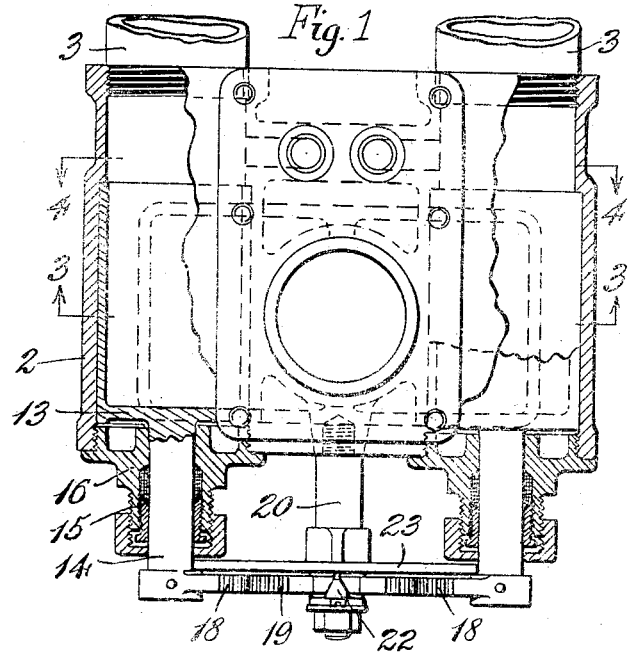
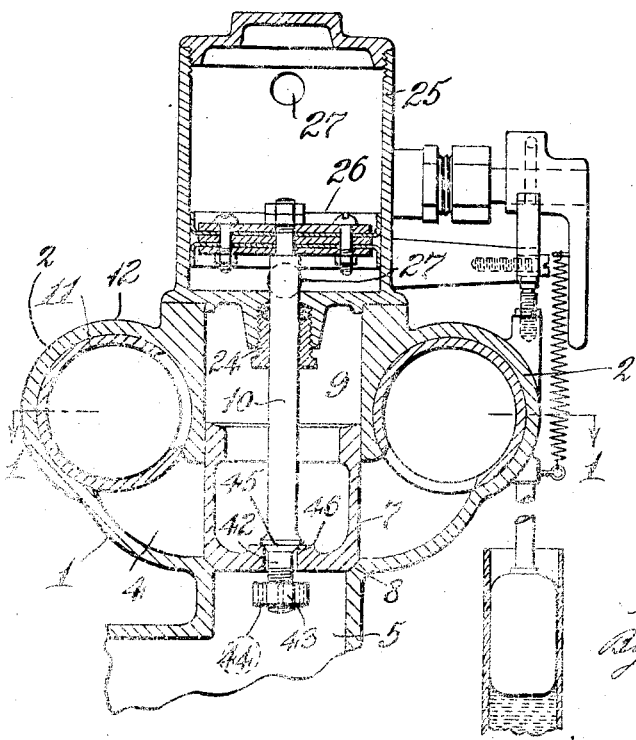
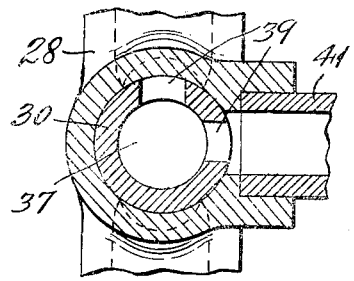
INVENTOR
Ernest W. Miller
By Brackett and Hyde
ATTORNEYS.

E. W. MILLER.
VALVE MECHANISM.
APPLICATION FILED DEC. 2, 1916.

1,376,109.

Patented Apr. 26, 1921.
3 SHEETS—SHEET 2.

INVENTOR
Ernest W. Miller
By Brockett and Hyde
ATTORNEYS.

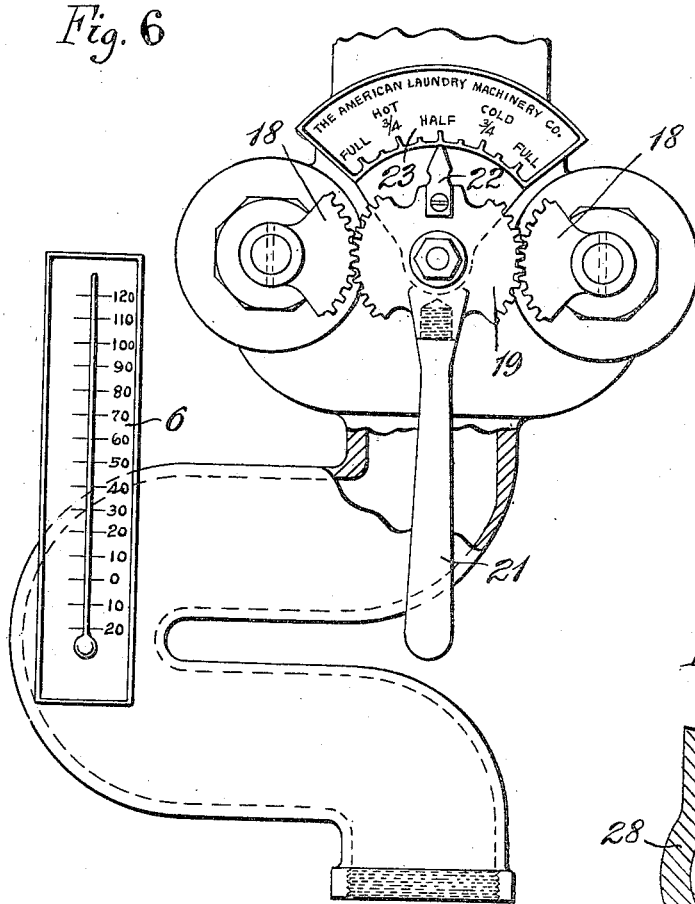
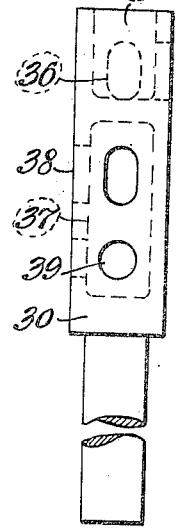
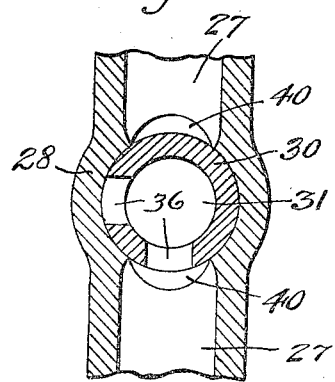
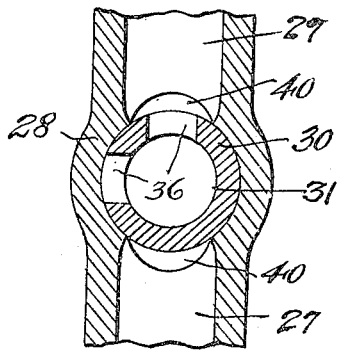

UNITED STATES PATENT OFFICE.

ERNEST W. MILLER, OF CINCINNATI, OHIO, ASSIGNOR TO THE AMERICAN LAUNDRY MACHINERY COMPANY, OF CINCINNATI, OHIO, A CORPORATION OF OHIO.

VALVE MECHANISM.

1,376,109.  Specification of Letters Patent.  Patented Apr. 26, 1921.

Application filed December 2, 1916. Serial No. 134,618.

*To all whom it may concern:*

Be it known that I, ERNEST W. MILLER, a subject of the King of Sweden, residing at Cincinnati, in the county of Hamilton and State of Ohio, have invented certain new and useful Improvements in Valve Mechanism, of which the following is a specification.

This invention relates to valve devices, and particularly to such devices used for controlling the flow of two kinds of liquid, such as hot and cold water, to a common delivery point. The invention may be applied, for example, for regulating the relative amounts of hot and cold water delivered to a washing machine for laundry use, but may be utilized in connection with other machines or devices, or for other purposes, as will be readily understood.

The object of the invention is to provide an improved valve device of the character described which enables the operator, by the manipulation of a single handle, to simultaneously regulate or adjust the quantities of hot and cold water in the mixture, thereby securing any desired temperature, and to also indicate what is the character of the mixture. A further object of the invention is to generally simplify and improve the valve mechanism and the operating devices therefor; to utilize the pressure of the incoming water supply to operate the main valve; and to also provide mechanism for automatically closing said main valve when a predetermined quantity of water has passed through the valve. Further objects of the invention are in part obvious and in part will appear more in detail hereinafter.

The invention comprises a valve device and mechanism hereinafter described and claimed.

Figure 10:
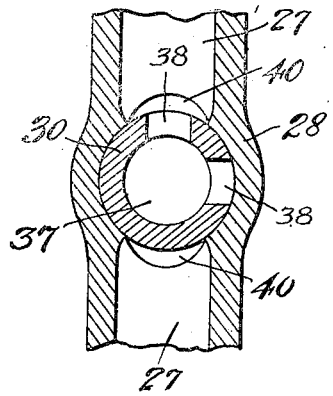
Figure 4:
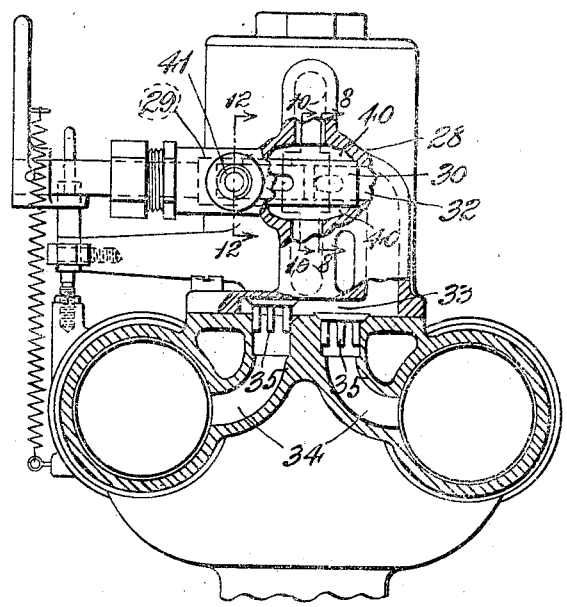
Figure 5:
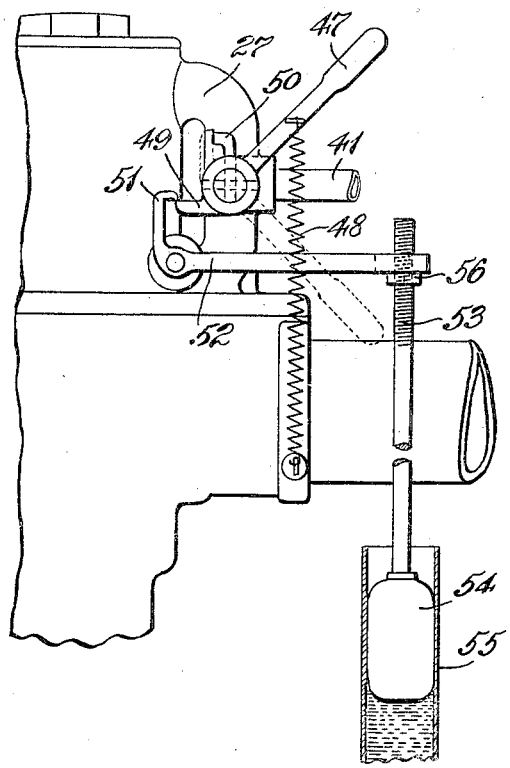
Figure 11:
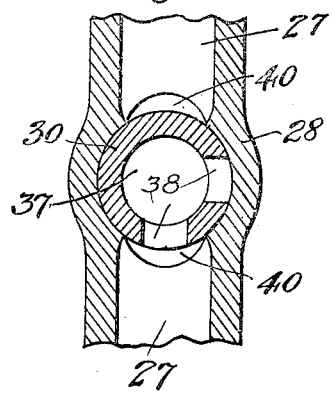

In the drawings, which represent one embodiment of the invention, Figure 1 is in part a plan view and in part a horizontal section on the line 1—1, Fig. 3; Fig. 2 is a perspective view of one of the inlet valves; Fig. 3 is a sectional elevation on the line 3—3, Fig. 1; Fig. 4 is a similar section on the line 4—4, Fig. 1; Fig. 5 is a side elevation, the view being taken from the left in Fig. 4; Fig. 6 is a front view, showing the main operating handle and indicating mechanism, the upper portion of the valve mechanism being omitted; Fig. 7 is a detail plan view of the pilot valve; Fig. 8 is a detail cross section on the line 8—8, Fig. 4; Fig. 9 is a similar view, showing the valve in another position; Figs. 10 and 11 are views corresponding to Figs. 8 and 9, the section being taken on the line 10—10, Fig. 4; Fig. 12 is a section on the line 12—12 of Fig. 4.

Referring to the drawings, the valve device illustrated comprises a suitable main casing 1 having two parallel hollow cylindrical portions 2 lying in horizontal position, the chambers in which communicate at one end with water inlet pipes 3, one for the cold water and one for the hot water, and which at their opposite ends communicate with passages 4 extending toward each other and both leading to the delivery conduit 5, which is suitably arranged for connection to the machine or device to which the mixed hot and cold water is to be delivered. As before stated, this machine may be a washing machine or any other mechanism or device. The delivery conduit 5 may be provided with a thermometer or other temperature indicating device, as indicated at 6, to indicate the temperature of the final mixture supplied by the valve mechanism.

The flow of water from the inlet pipes to the supply conduit 5 is controlled by a main valve 7, which may be of any suitable form but is shown as a cylindrical valve coöperating with a seat 8 at the entrance to the supply conduit, and which valve slides in a cylinder 9 and is provided with an operating stem 10. The two conduits 4, when the main valve is open, together form a mixing chamber in which the supplies of hot and cold water, in whatever relative amount they may be, are mixed before flowing out through the conduit 5. The amounts of hot and cold water in the mixture are controlled by two similar primary valves 11, one of which is shown in Fig. 2. Each of said valves comprises a hollow cylindrical member having rotating movement in the chamber of one of the cylindrical casing portions 2, said member being open at one end, as at 12, and closed at the other end by a cross wall 13 to which is connected a valve stem 14 extending out through a stuffing box 15 in a cap 16 threaded into the end of the casing. Each valve member is also provided with a large side port or opening 17 adapted by rotation of said valve member to be moved into or out of registration with the conduit 4 with which the valve communicates. Each valve stem, on its outer end, is provided with a gear segment 18, the segments for the two valve members lying on opposite sides of and both meshing with an intermediate operating gear 19 rotatable on a shaft 20 supported by the casing and provided with an actuating handle 21, as indicated in Fig. 6. By turning this handle in one direction or the other both of the valve members are turned in their chambers. The two valves always rotate together in the same direction, one way or the other, but the spacing and relative location of their ports 17 is such that operation of the handle 21 in one direction increases the effective opening through one of the primary valves and decreases the opening through the other. This operation therefore, increases the amount of one of the constituents of the mixture and decreases the amount of the other. If the two liquids are hot and cold water, as before described, manipulation of the handle 21 in one direction or the other therefore enables the operator to vary either way the relative amounts of hot and cold water so as to secure practically any desired temperature of the mixture from the temperature of the cold water to the temperature of the hot water. The two extreme positions of the handle, of course, open one valve wide and close the other. Preferably suitable means is provided for indicating the character of the mixture, such for example as the indicating pointer 22 carried by the gear member 19 or some other part actuated by the handle 21 and which pointer travels over a scale 23.

The main valve 7 has vertical movement in the casing and is located between the two primary valves 11. Its valve stem passes through a packing 24 into a hollow cylinder 25 extending upwardly from the casing and in which is located a valve actuating piston 26. The space within the cylinder 25 communicates with two conduits or passages 27 leading to a pilot valve casing 28, in which is a valve arranged to supply pressure to either face of the piston 26 for opening or closing the main valve. The pilot valve casing is located in front of the main actuating cylinder 25 and has a horizontal laterally extending cylindrical bore 29 to receive the pilot valve 30 shown in Fig. 7. This valve at one end is provided with a cavity 31 opening out through its end and communicating with a passage 32 extending downwardly to the main valve casing and communicating with a horizontal passage 33, which in turn communicates with two downwardly extending passages 34 communicating with the main inlet conduits beyond the primary valves 11, as shown in Fig. 1. In each of the conduits 34 is a check valve 35 seating toward the water inlet. Either or both of the valves 35 therefore supplies pressure to the pilot valve chamber, according to whether water pressure is turned on to one or both of the water inlets. The pilot valve also has two lateral ports 36, located at an angle of 90° to each other, which communicate with the chamber 31, and a cored-out chamber 37 which communicates with two sets of ports, to-wit, two lateral ports 38 at an angle of 90° to each other located near one end of the chamber 37 and next to the ports 36, and two similarly disposed lateral ports 39 at the other end of the chamber 37. The passages 27 communicating with the cylinder 25 terminate in longitudinally disposed grooves or channels 40 above and below the pilot valve, and which channels 40 overlap the ports 36 and 38 but do not extend to the ports 39. The lateral ports 39 are adapted to be brought into registration with a lateral passage in the valve casing leading to an exhaust outlet pipe 41, which may extend to the sewer or to any other suitable point.

In the position of the parts shown in Figs. 4 and 8, water flows from the inlet pipes through passages 34, 33 and 32 to the pilot valve chamber 31, thence through the power port 36 to the lower channel 40 and by way of the lower passage 27 to the under face of the piston 26, the pressure being effective to raise the main valve 7 and allow the mixture to flow to the supply conduit 5. The piston stem 10 has a reduced portion 42 extending through a larger opening in the head of the valve, and on its lower end the valve-stem carries a nut 43 having a series of small openings 44 therein. When the piston 26 rises, the water trapped behind the main valve can flow past the piston through the openings 44 so that the valve readily opens by a quick movement. The water in the chamber above the piston flows out through the upper passage 27 to the upper longitudinal groove 40, thence through the upper port 38 to the cored-out chamber 37 of the pilot valve, and by way of the front port 39 to the exhaust passage 41, as in Fig. 10.

The pilot valve may be rotated 90° to its other extreme position, shown in Figs. 9 and 11. In this position water from the inlet connections flow to the pilot valve chamber 31, thence through the upper port 36 to the upper longitudinal groove 40 and by way of passage 27 to the upper face of the piston. The valve stem, above the head of the main valve 7 has a valve member 45 which is forced down against a seat 46 at the upper end of the opening through the valve. It will be understood that the valve 7 is not a tight fit in the chamber in which it slides. Consequently the valve can move downwardly and water flows from the mixing chamber 4 around the piston to the cavity behind the valve. This flow, however, is restricted so that the valve closes with a slow steady movement, finally seating without chattering or vibration. In the final closed position of the ports, shown in Fig. 3 the main valve is held tightly against its seat and the subsidiary valve 45 to its seat 46 by the pressure in the piston chamber. The outlet from the mixing chamber 4 is therefore closed tightly both around and through the main valve and no leakage can occur. During the closing movement of the valve the water beneath the main piston 26 exhausts through the lower conduit 27, groove 40, chamber 37 and exhaust outlet 41, as in Fig. 11, as will be readily understood.

The pilot valve is actuated by an operating handle 47, which may be operated manually, if desired. As shown, however, a tension spring 48 connected to said handle always tends to turn the pilot valve to the main valve closing position, indicated in dotted lines Fig. 5. Attached to the handle is a lug 49, which contacts with a fixed stop 50 in the main valve closing position of the pilot valve. Said lug also coöperates with a latch hook 51 on a bell crank lever 52 whose opposite end is connected by a rod 53 to a float 54 which may be located in the machine or apparatus being supplied with water, or in a stand pipe 55 communicating therewith. The rod 53 is provided with an adjustable stop, shown as a nut 56 threaded onto said rod, which is adapted, when the level of liquid in the machine being supplied reaches the desired level, to engage the bell crank lever and oscillate the same about its pivot, thereby disengaging the hook 51 from the lug 49. This releases the pilot valve to the action of spring 48, which turns the pilot valve to the main valve closing position.

With the arrangement described the operator can adjust the handle 21 to secure any desired temperature of the final mixture flowing to the machine or apparatus being supplied. By setting the adjustable stop 56 at the proper level and engaging the lug 49 and hook 51 the operator can also set the valve mechanism to close the water supply to the machine when the level of water therein reaches the desired point, at which time the mechanism automatically closes the main valve and shuts off the water supply.

The apparatus described is of simple form, is easily kept liquid tight, prevents any leakage past the valve mechanism to the machine, and can be readily adjusted and controlled.

What I claim is:—

1. Valve mechanism, comprising a valve casing provided with a mixing chamber and with communication to two separate liquid supplies, two parallel cylindrical hollow valves rotatable in said casing, each valve at one end being open to one of said supplies and provided with a lateral port adapted to be moved into and out of registration with an opening to said chamber, and means for operating said valves.

2. Valve mechanism, comprising a valve casing provided with a mixing chamber and with communication to two separate liquid supplies, two parallel cylindrical hollow valves rotatable in said casing, each valve at one end being open to one of said supplies and provided with a lateral port adapted to be moved into and out of registration with an opening to said chamber, and a single means for operating both of said valves.

3. Valve mechanism, comprising a valve casing provided with a mixing chamber and with communication to two separate liquid supplies, two parallel cylindrical hollow valves rotatable in said casing, each valve at one end being open to one of said supplies and provided with a lateral port adapted to be moved into and out of registration with an opening to said chamber, and a single means for operating both of said valves, the ports in said valves being so arranged that operation of said means in one direction opens one valve and closes the other.

4. Valve mechanism, comprising a valve casing provided with a mixing chamber and with communication to two separate liquid supplies, means for varying the relative quantities of the two liquids flowing to said chamber, a valve controlling the flow of mixture from said chamber, and means actuated by either or both of said liquid supplies for operating said valve.

5. Valve mechanism, comprising a valve casing provided with two parallel valve chambers communicating at one end of the casing with separate liquid supplies and at their opposite ends communicating with a common mixing chamber, valves in said valve chambers, a main valve controlling the flow of liquid from said mixing chamber, a motor cylinder whose axis is located between, and is perpendicular to, the axes of the valve chambers, a piston in the chamber of said cylinder, and a rod located between said valve chambers and connecting said piston and main valve.

6. Valve mechanism, comprising a valve casing provided with two parallel valve chambers communicating at one end of the casing with separate liquid supplies and at their opposite ends communicating with a common mixing chamber, valves in said valve chambers, a main valve controlling the flow of liquid from said mixing chamber, a motor cylinder whose axis is located between, and is perpendicular to, the axes of the valve chambers, a piston in the chamber of said cylinder, a rod located between said valve chambers and connecting said piston and main valve, and means connecting the piston chamber of said cylinder to the neighboring supply ends of said valve chambers.

7. Valve mechanism, comprising a valve casing provided with two parallel valve chambers, communicating at one end of the casing with separate liquid supplies and at their opposite ends communicating with a common mixing chamber, valves in said valve chambers, a main valve controlling the flow of liquid from said mixing chamber, a motor cylinder whose axis is located between, and is perpendicular to, the axes of the valve chambers, a piston in the chamber of said cylinder, a rod located between said valve chambers and connecting said piston and main valve, two conduits connecting the piston chamber of said cylinder to the neighboring supply ends of said valve chambers, and a check valve in each of said conduits seating toward the liquid supplies.

8. Valve mechanism, comprising a valve casing provided with two parallel valve chambers communicating at one end of the casing with separate liquid supplies and at their opposite ends communicating with a common mixing chamber, valves in said valve chambers, a main valve controlling the flow of liquid from said mixing chamber, a motor cylinder whose axis is located between, and is perpendicular to, the axes of the valve chambers, a piston in the chamber of said cylinder, a rod located between said valve chambers and connecting said piston and main valve, two conduits connecting the piston chamber of said cylinder to the neighboring supply ends of said valve chambers, and a pilot valve controlling the flow of liquid through said conduits to the piston chamber.

9. Valve mechanism, comprising a valve casing provided with two parallel valve chambers communicating at one end of the casing with separate liquid supplies and at their opposite ends communicating with a common mixing chamber, valves in said valve chambers, a main valve controlling the flow of liquid from said mixing chamber, a motor cylinder whose axis is located between, and is perpendicular to, the axes of the valve chambers, a piston in the chamber of said cylinder, a rod located between said valve chambers and connecting said piston and main valve, two conduits connecting the piston chamber of said cylinder to the neighboring supply ends of said valve chambers, a pilot valve controlling the flow of liquid through said conduits to the piston chamber, yielding means tending to move said pilot valve to main valve closing position, a latch for holding the pilot valve in main valve opening position, and means actuated by the liquid flowing through the main valve for releasing said latch.

In testimony whereof I affix my signature.

ERNEST W. MILLER.